United States Patent [19]

Benecke et al.

[11] Patent Number: 4,671,432

[45] Date of Patent: Jun. 9, 1987

[54] PUMP DISPENSER FOR FLUENT PRODUCTS FEATURING A RECIPROCABLE PLUNGER AND DIAPHRAGM SEAL

[75] Inventors: Arnold G. Benecke, Hamilton, Ohio; Douglas H. Benson, West Harrison, Ind.; William H. Goodman, Jr.; Robert H. Van Coney, both of Cincinnati, Ohio

[73] Assignee: The Procter & Gamble Company, Cincinnati, Ohio

[21] Appl. No.: 789,871

[22] Filed: Oct. 21, 1985

[51] Int. Cl.[4] .......... B67D 5/42; F16J 3/02

[52] U.S. Cl. .......... 222/386; 222/405; 222/256; 222/383; 92/98 D; 92/99

[58] Field of Search .......... 222/383, 384, 385, 340, 222/209, 405, 386, 391, 259, 260, 256, 206, 215; 92/98 D, 99; 264/510, 516

[56] References Cited

U.S. PATENT DOCUMENTS

| | | | |
|---|---|---|---|
| 1,296,391 | 3/1919 | Hirsch . | |
| 2,334,032 | 11/1943 | Rhodes | 65/45 |
| 2,360,603 | 10/1944 | Ward | 222/153 |
| 2,483,656 | 10/1949 | Marschalk | 241/38 |
| 2,537,241 | 1/1951 | Smith | 103/150 |
| 2,576,894 | 11/1951 | Van Ranst | 103/150 |
| 2,792,974 | 5/1957 | Smith et al. | 222/376 |
| 2,793,793 | 5/1957 | Sampson | 222/335 |
| 3,120,817 | 2/1964 | Price et al. | 103/228 |
| 3,236,158 | 2/1966 | Taplin | 92/103 |
| 3,375,759 | 4/1968 | Smith | 92/98 D |
| 3,422,807 | 1/1969 | Waldecker | 123/196 |
| 3,491,920 | 1/1970 | Racki et al. | 222/335 |
| 3,519,170 | 7/1970 | Lankelma, Jr. | 222/212 |
| 3,827,130 | 8/1974 | Baumann | 264/516 X |
| 3,854,826 | 12/1974 | Adams | 401/188 |
| 3,874,052 | 4/1975 | Schantz | 264/516 X |
| 3,941,519 | 3/1976 | McCauley | 417/560 |
| 3,979,027 | 9/1976 | Loeffler | 222/193 |
| 4,079,861 | 3/1978 | Brown | 222/135 |
| 4,181,477 | 1/1980 | Litt | 417/560 |
| 4,208,060 | 6/1980 | St. Laurent, Jr. | 272/212 |
| 4,219,042 | 8/1980 | St. Laurent, Jr. | 137/85 |
| 4,229,010 | 10/1980 | St. Laurent, Jr. | 277/30 |
| 4,244,589 | 1/1981 | St. Laurent, Jr. | 277/30 |
| 4,253,675 | 3/1981 | St. Laurent, Jr. | 277/30 |
| 4,263,838 | 4/1981 | St. Laurent, Jr. | 91/387 |
| 4,310,107 | 1/1982 | Wesner | 222/214 |

(List continued on next page.)

*Primary Examiner*—Joseph J. Rolla
*Assistant Examiner*—Nils Pedersen
*Attorney, Agent, or Firm*—Richard C. Witte; John V. Gorman

[57] ABSTRACT

A pump dispenser for fluent products is disclosed as inluding a container for housing the fluent product, dispensing outlet means on the container, a follower piston closing the lower end of the container below the product, and means for varying the volume within such dispenser. The volume varying means comprises a plunger adapted to be reciprocated within the dispenser to alternately decrease the volume therewithin and, following such decrease, return to its original position thereby increasing the volume within the dispenser. The plunger further comprises a peripheral skirt having predetermined outer lateral dimensions at its lower distal end, and an enlarged attachment head on such lower distal end. The attachment head has predetermined outer lateral dimensions which are larger than the outer lateral dimensions of such lower distal end therey effectively forming a reentrant portion on the plunger above the enlarged head. A flexible thin-walled diaphragm adapted to isolate and seal the volume reducing means from the fluent product is connected about its outer periphery to the dispenser. The diaphragm further has a central portion substantially conforming to the enlarged attachment head and reentrant portion of the plunger thereby effectively locking the diaphragm to the plunger and its attachment head. The attached diaphragm is thereby adapted to provide a substantially frictionless seal between the reciprocable plunger and the fluent product. The unique structure and combination of the plunger and flexible diaphragm of the subject pump dispenser provides for ease of manufacturing and handling of such pump dispenser subassembly.

19 Claims, 7 Drawing Figures

| | | | |
|---|---|---|---|
| 4,344,548 | 8/1982 | Frazier | 222/209 |
| 4,361,457 | 11/1982 | Keeler et al. | 264/510 X |
| 4,390,036 | 6/1983 | Athanassiu et al. | 137/116.5 |
| 4,466,455 | 8/1984 | Athanassiu et al. | 137/116.5 |
| 4,474,725 | 10/1984 | Sands | 264/510 |
| 4,488,341 | 12/1984 | Scott et al. | 264/510 X |
| 4,511,068 | 4/1985 | Bossina | 222/257 |
| 4,515,298 | 5/1985 | Czech | 222/380 |
| 4,533,069 | 8/1985 | Drobish | 222/209 |
| 4,564,130 | 1/1986 | Eulenburg | 222/383 X |
| 4,569,378 | 2/1986 | Bergandy | 92/98 D X |

PUMP DISPENSER FOR FLUENT PRODUCTS FEATURING A RECIPROCABLE PLUNGER AND DIAPHRAGM SEAL

TECHNICAL FIELD

This invention relates to a pump dispenser for fluent products featuring a reciprocating plunger and a thin-film diaphragm seal between such plunger and the product container; and, more particularly, to a pump dispenser featuring a plunger having an enlarged attachment head on its lower portion around which a flexible thin-walled diaphragm seal is effectively locked to provide a substantially frictionless seal between the plunger and the contained product.

BACKGROUND ART

The use of a flexible membrane structure as a seal for various pump and pressure operated systems can be found in a variety of applications in the art. For example, U.S. Pat. No. 4,181,477, which issued to K. Litt on Jan. 1, 1980, discloses a pump valve incorporating a flexible valve seat connected to a reciprocating pumping piston, wherein such valve seat moves with the piston and isolates the pumped media from the exterior piston surface. The Litt valve seat deforms and stretches to permit reciprocation of the pumping piston while maintaining a peripheral seal thereabout. The flexibility and memory of the valve seat material allow it to return to its original shape between deformations. Similarly, U.S. Pat. No. 4,310,107, which issued to W. Wesner on Jan. 12, 1982, illustrates a manually operated trigger-type pump dispenser incorporating a flexible elastomeric diaphragm-like cover on one side of its internal pump chamber. The Wesner diaphragm-like cover is operatively associated with the trigger device such that, upon actuation of such device, it flexes and stresses in a direction to decrease the chamber volume. Upon release of the trigger actuation force, the diaphragm returns to its original condition as a result of elastic memory. Another flexible seal is disclosed in U.S. Pat. No. 2,360,603, which issued to L. Ward on Oct. 17, 1944. The Ward reference describes an aerating bottle which includes a valve stem having a head portion embedded in a valve plug. The valve plug includes a flexible sleeve element made of resilient material which houses a spring which tends to normally seat the valve plug on a valve seat of the aerating bottle. When the valve plug is lifted from the valve seat, the sleeve element isolates the spring and valve plug interior from product being dispensed. When the valve is again closed, the sleeve element is thereby resiliently extended to its original condition by the force of the spring.

U.S. Pat. No. 1,296,391, which issued to L. Hirsch et al. on Mar. 4, 1919, describes a liquid dispenser incorporating a compressible bulb member which can be compressed to effectively pressurize the interior air space of the liquid dispenser to force contained liquid through the dispenser's outlet spout. The Hirsch et al. dispenser includes a plunger member having a lower portion which bears directly upon the outer surface of the compressible bulb to axially compress the same within the dispenser's spherical casing.

Additionally, rolling-type flexible diaphragms have been widely used in pneumatic-type relay controls and other pump dispensing devices. For example, U.S. Pat. No. 4,219,042, which issued to W. St. Laurent, Jr. on Aug. 26, 1980, discloses a pneumatic relay incorporating a rolling diaphragm having an outer clamping flange and an inner clamping flange with an intermediate rolling wall. In particular, the St. Laurent, Jr. rolling diaphragm is immovably clamped about its periphery, and clamped at its center between a reciprocable valve seat and a compression spring retainer cup. As the valve seat is reciprocated axially within the relay, the rolling diaphragm walls serve to maintain a seal therewithin. Similarly, the Bellofram Corporation of Burlington, Mass. is a manufacturer of a variety of rolling diaphragms and describes many different models in its publication entitled *Diaphragm Design Manual,* published in 1980 by the Bellofram Corporation. Similar applications of rolling-type flexible diaphragms in pump dispensing applications are shown in U.S. Pat. Nos. 4,079,861 and 3,491,920, which issued to M. Brown on Mar. 21, 1978 and to F. Racki et al. on Jan. 27, 1970, respectively.

Despite the relatively wide use of such flexible and rolling-type diaphragm seals in pump dispensing applications, there remain problems of effectively attaching such diaphragms to reciprocable plunger structures in a manner which will not compromise the integrity of the diaphragm seal and which will provide smooth rolling of the rolling walls of such diaphragm without interference with adjacent structures. These problems become especially acute when such diaphragms are made of relatively thin materials which can be easily damaged and which are difficult to handle in the manufacturing process. Prior art structures did not adequately provide for easy manufacturing and handling of such thin-walled flexible diaphragms, nor did they take into account the required plunger or piston structure necessary to facilitate such manufacturing procedures and to improve the attachment and rolling performance of such diaphragms.

DISCLOSURE OF THE INVENTION

It is an object of this invention to obviate the above-described problems.

It is another object of the present invention to provide a pump dispenser incorporating a plunger to be reciprocated within the dispenser and including an enlarged attachment head on its lower portion over which a flexible thin-walled diaphragm can be effectively locked.

It is yet another object of the present invention to provide a pump dispenser for fluent products which minimizes the frictional resistance normally encountered in push-button type dispensers upon reciprocating a pump piston within such dispenser.

It is also an object of the present invention to provide a simplified method of manufacturing a volume varying means subassembly for a pump dispenser for fluent products, with such subassembly including a plunger member adapted to be reciprocated within the dispenser and having an enlarged attachment head attached to its lower distal end, and a flexible thin-wall diaphragm which can be formed directly onto such plunger structure and effectively locked onto its attachment head and lower surfaces.

In accordance with one aspect of the present invention, there is provided a pump dispenser for fluent products including a container for housing the product to be dispensed, dispensing outlet means on the container, a follower piston closing the lower end of the container below the product, and means for varying the volume within such dispenser to dispense the product. The volume varying means further includes a plunger adapted to be reciprocated within the dispenser to alternatively decrease the volume therewithin and, following such decrease, return to its original position thereby increasing the volume within the dispenser. The plunger is to include a peripheral skirt having predetermined outer lateral dimensions at its lower end, and an enlarged attachment head on the lower distal end of such peripheral skirt. The attachment head has predetermined outer lateral dimensions which are larger than the lateral dimensions of the distal end of the peripheral skirt, thereby effectively forming a reentrant portion on the plunger above such attachment head. The volume varying means further includes a flexible thin-walled diaphragm adapted to isolate and seal the volume reducing means from the product contained within such dispenser. The diaphragm is connected about its outer periphery to the dispensing container and has a central portion substantially conforming to the enlarged attachment head and reentrant portion of the plunger, thereby effectively locking the diaphragm to the plunger and the attachment head. The diaphragm is adapted to provide a substantially frictionless seal between the reciprocable plunger and the container.

BRIEF DESCRIPTION OF THE DRAWINGS

While the specification concludes with claims particularly pointing out and distinctly claiming the present invention, it is believed that the same will be better understood from the following description taken in conjunction with the accompanying drawings in which:

DETAILED DESCRIPTION OF THE INVENTION

Figure 1:
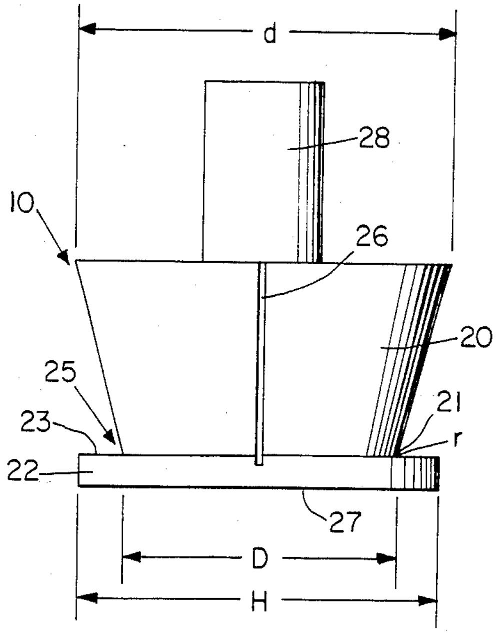
FIG. 1 is a front elevational view of a plunger structure made in accordance with the present invention.

Referring now to the drawings in detail, wherein like numerals indicate the same elements throughout the views, a plunger 10 for a pump dispenser for fluent products is shown as comprising a peripheral skirt 20 and an enlarged attachment head 22 attached on the lower distal end thereof. Peripheral skirt 20 is to have a predetermined outer lateral dimension (such lateral dimension being a diameter for circular cross-sections) D at its lower distal end 21, and enlarged attachment head 22 is to have a predetermined outer lateral dimension H which is larger than predetermined dimension D. This dimensional relationship (i.e. H greater than D) is necessary to insure that a slightly outwardly extended surface or ledge 23 be formed above attachment head 22 for proper attachment of a flexible thin-walled diaphragm, as will be discussed in greater detail below. The upper surface or ledge 23 of attachment head 22 thereby effectively forms a reentrant portion 25 on plunger 10 above attachment head 22. As discussed below, in a preferred execution, plunger 10 will feature substantially circular cross-sections in its skirt and enlarged head areas, wherein dimensions H and D will be diameters. Specific measurements of lateral dimension H for a particular plunger can be chosen based on the volume of fluent product desired to be dispensed in a single dispensing operation with a given axial stroke length of such plunger. Accordingly, for a given amount of fluent product to be dispensed, a longer plunger stroke length would require a smaller dimension H, and vice-versa.

Figure 3:
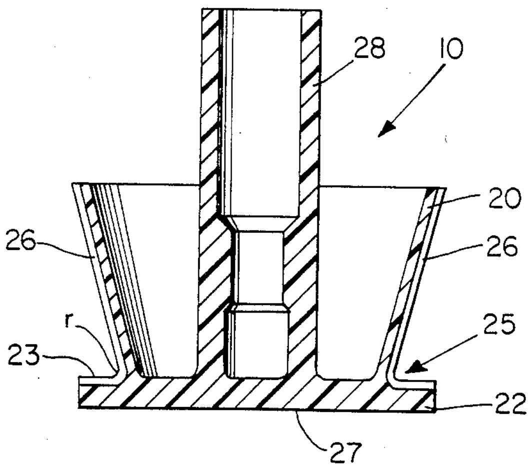
FIG. 3 is a vertical cross-sectional view of the plunger of FIGS. 1 and 2, taken along line 3—3 of FIG. 2.

Plunger 10 can be formed from any relatively rigid material, however, it is preferred that the plunger be formed from a lightweight plastic material such as polyethylene or the like. Such materials provide ease in manufacturing, relative low cost, are lightweight, and provide resilient rigidity nicely adaptable to the pump dispenser environment. FIGS. 1 and 3 illustrate the junction between upper surface or ledge 23 of attachment head 22 and distal end 21 of peripheral skirt 20 as including a slight radius r. Although this radius is not critical, it has been found that a small radius r can be provided to facilitate molding of plunger 10 as in integral part. In this regard, it is also not critical that plunger 10 be made as a single unitary piece. It is contemplated that attachment head 22 might preferably be molded separately from peripheral skirt 20 and attached in any convenient way (such as by adhesives, snap-fit arrangements, heat sealing, spin welding, or the like) to lower distal end 21 of peripheral skirt 20. Similarly, peripheral skirt 20 is shown as being slightly tapered from top to bottom such that the dimension d thereof at the upper end is greater than the predetermined dimension D of lower distal end 21. It has been found that providing peripheral skirt 20 with such a taper aids the smooth rolling-type action of the flexible thin-walled diaphragm which is to be attached to plunger 10, as will be discussed in greater detail below.

Oppositely disposed vacuum slots 26 are illustrated as extending longitudinally along the outer surfaces of peripheral skirt 20 and continuing radially across the upper face or ledge 23. These slots are illustrated only as a preferred example of means to provide fluid communication along plunger 10 with a source of vacuum such that during thermoforming procedures of the flexible diaphragm over plunger 10, vacuum can draw the thermoformable material snugly around attachment head 22 and into reentrant portion 25. The ability to draw the thermoformable material around head 22 and snugly into reentrant portion 25 and against the lower distal end 21 of the peripheral skirt 20 is important to ensure that the resulting flexible diaphragm will be effectively locked onto plunger 10 over attachment head 22. Other means of providing such fluid communication could equally be substituted. For example, apertures (not shown) could be formed through peripheral skirt 20 proximate the reentrant portion 25 and connected through the interior of plunger 10 to a source of vacuum. In designing such means, however, it is important to take into account that such means must not be so large as to permit the drawing of such thermoformable material into such means, as weakening and/or perforation of the material might result, which could negatively affect the integrity of the seal to be created by such diaphragm. In this regard, apertures, slots, and the like should be sufficiently small to prevent the vacuum from drawing such thermoformable material thereinto during the thermoforming procedure, as will be described in greater detail below.

Figure 2:
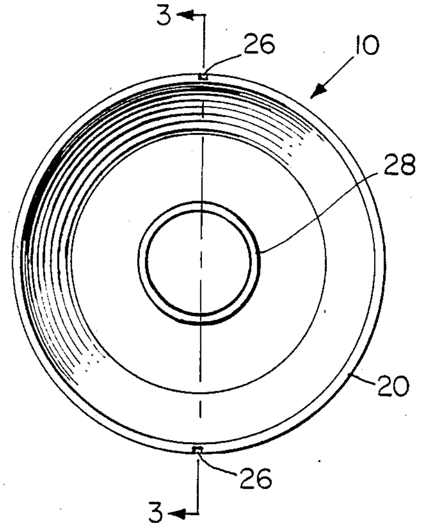
FIG. 2 is a top plan view of the plunger of FIG. 1.

Peripherial skirt 20 is shown as being substantially hollow to minimize material usage and cost and to facilitate molding operations. Plunger 10 also is shown as including attachment means 28 which, in a preferred execution, is used to connect the reciprocable plunger to manual activation means of the volume varying means on the container. Specific dimensions and wall thicknesses of plunger 10 are not critical and will greatly depend on the specific size and application of the pump dispenser to be formed. For example, relative overall dimensions/diameters of attachment head 22 and peripheral skirt 20 will depend to a large extent on the size of the container and the volume of product desired to be dispensed in each dispensing operation. Similarly, exact wall thicknesses of the plunger will depend somewhat on the relative overall size of the plunger, strength and rigidity requirements related thereto, and molding or manufacturing restrictions. Again, while plunger 10 is illustrated in FIG. 2 as having a substantially circular cross-section, such need not be the case. Although such circular conformation is preferred, it is envisioned that plunger 10 could be formed with a non-circular cross-section (e.g. ovate, square, triangular, etc.).

Figure 4:
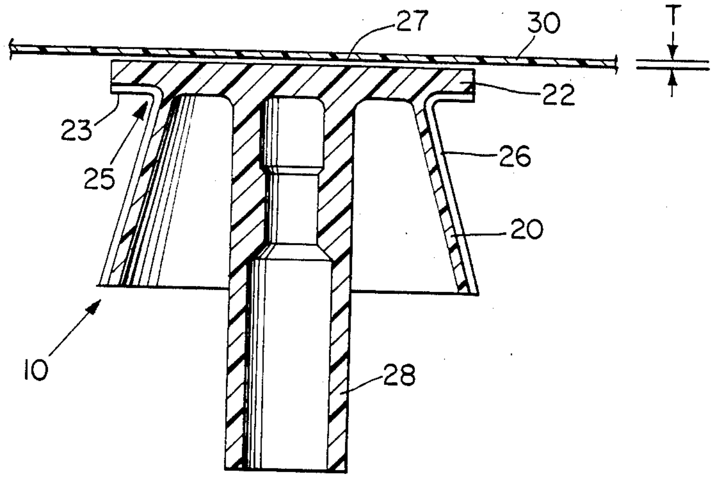
FIG. 4 is a vertical cross-sectional view of the plunger of FIG. 1 shown below and adjacent a sheet of flexible thermoformable material just prior to the thermoforming of such material around such plunger.
Figure 5:
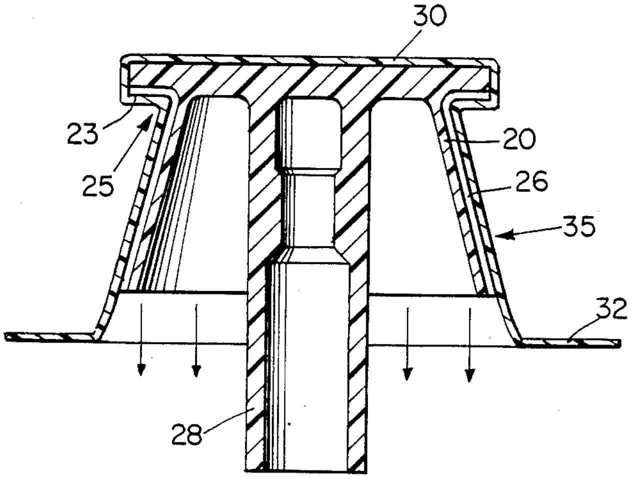
FIG. 5 is a vertical corss-sectional view of the plunger of FIG. 4 shown after such thermoformable material has been thermoformed around such plunger to form a flexible thin-walled diaphragm thereover.

FIGS. 4 and 5 show cross-sectional views of a plunger 10 situated beneath a relatively thin sheet of thermoformable material 30. While the thickness T of thermoformable material 30 can vary relatively widely depending upon the overall size of plunger 10 and the specific pump dispenser application contemplated, it is preferred that thickness T of material 30 be minimized to correspondingly minimize the amount of material 30 needed, and to maximize the flexibility of the resulting flexible diaphragm to be formed therefrom. FIGS. 4 and 5 specifically illustrate portions of the preferred method of forming a volume varying means subassembly of the subject invention. Such subassembly is to include a plunger (e.g. plunger 10) and a flexible thin-walled diaphragm (e.g. diaphragm 35) attached thereto. In particular, the plunger member of the subject invention is first formed with the peripheral skirt and enlarged attachment head as described above. Plunger 10 with its disk-like attachment head 22 and peripheral skirt 20 is illustrated as an example. A sheet of flexible thermoformable material 30 is located adjacent the lower surface 27 of attachment head 22 of plunger 10. Thermoformable material 30 is to be heated to a temperature sufficient to permit thermoforming thereof, and, thereafter, is thermoformed around the outer surfaces of attachment head 22 and reentrant portion 25 of plunger 10.

The thermoforming process conforms portions of the thermoformable material 30 to the plunger and effectively locks such material 30 to the outer lower edges of plunger 10 and its attachment head 22. This thermoforming procedure is most preferably accomplished by subjecting plunger 10 and the lower portions of thermoformable material 30 to a vacuum, as shown in FIG. 5. The vacuum acts to draw the thermoformable material 30 around the outer surfaces of attachment head 22 in a downward direction. Vacuum slots 26 enable such vacuum source to further draw the thermoformable material snugly against ledge 23, into reentrant portion 25, and against the outer surfaces of peripheral skirt 20. Additional molding inserts (not shown) can be used to facilitate formation of an outwardly extending peripheral flange 32 of the resulting flexible thin-walled diaphragm 35 created by this thermoforming process. Again, it is important that vacuum channels 26 (or whatever means are utilized to provide fluid communication of plunger 10 with a source of vacuum during the thermoforming process) have width and depth dimensions which are large enough to provide such fluid communication but small enough to prevent material 30 from being drawn thereinto during such thermoforming operations. If material is drawn into such vacuum slots, weakening and/or perforating the material may result, and/or fluid communication with such vacuum source may be cut off, thereby obstructing proper completion of the thermoforming operations.

Once flexible diaphragm 35 has been formed, as shown in FIG. 5, the balance of thermoformable material 30 may be cut away at a desired radial distance from the center of plunger 10 to separate diaphragm 35 therefrom. At this point, the plunger/diaphragm subassembly is ready for assembly with other parts into a pump dispenser.

Figure 6:
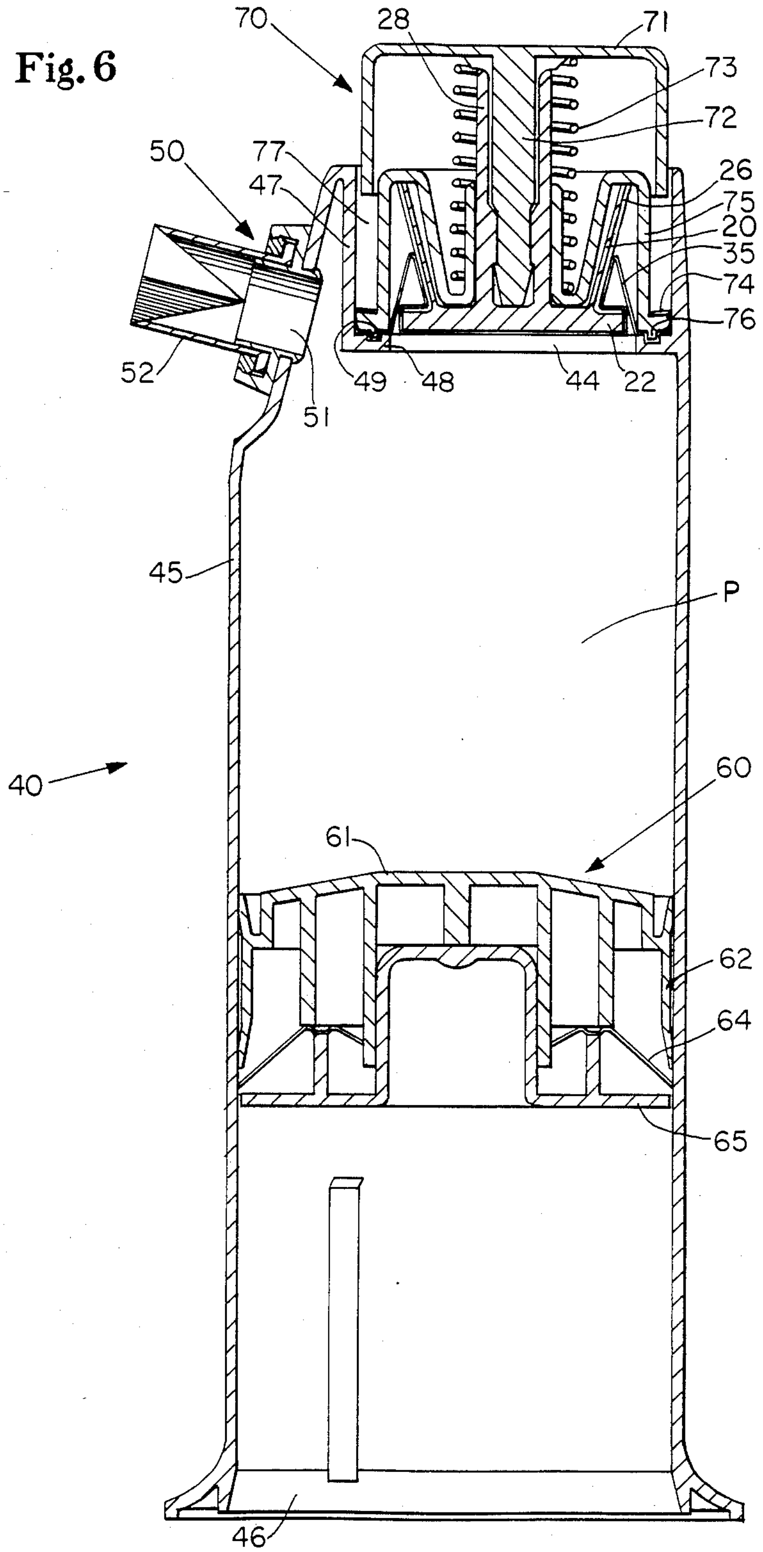
FIG. 6 is a vertical cross-sectional view of a pump dispenser for fluent products made in accordance with the present invention having a means for varying the volume within such dispenser which includes a plunger and a flexible thin-walled diaphragm as shown in FIG. 5 hereof, with such means for varying the volume shown in a retracted position within such dispenser.

FIG. 6 shows a vertical cross-sectional view of a pump dispenser 40 made in accordance with the subject invention. In particular, pump dispenser 40 includes a container 45 for housing fluent product P to be dispensed. Container 45 further includes dispensing outlet means 50. Dispensing outlet means 50 is shown as comprising outlet orifice 51 formed in the upper portions of container 45, and a self-sealing dispensing outlet 52 mounted over dispensing outlet 51. Self-sealing dispensing outlet 52 can be any of a plethora of nozzles commonly used in pump-type dispensers, such as the combination check valve and self-sealing closure illustrated and described in U.S. Pat. No. 4,533,069, which issued to James L. Drobish on Aug. 6, 1985, such patent being hereby incorporated herein by reference. It is preferred to utilize such a combination check valve and self-sealing nozzle to provide an outlet check valve for he dispenser and clean product cutoff at the end of a dispensing operation.

Pump dispenser 40 further includes a follower piston 60 which substantially closes the open lower end 46 of container 45, and supports product P thereabove. Follower piston 60 is illustrated as including one-way detent means 64 which prevent retrograde movement of piston 60 within container 45, and cap 65 which holds detent means 64 within piston 60. Detent means 64 can be any of a wide variety of one-way structures commonly used in the industry (such as outwardly extending radial prongs or the like). Additionally, piston 60 is shown as having an upper surface or face 61 which is connected about its periphery to a depending sidewall 62 which includes means to seal piston 60 against the inner surfaces of container 45 to prevent leakage of product P through open end 46. While it is not imperative that piston 60 be of such a one-way variety (as also disclosed in the referenced U.S. Pat. No. 4,533,069), it is generally preferred to utilize such a one-way piston to obviate a need for a defined pump chamber and an inlet check valve arrangement, and to provide a pump dispenser which can be used with a variety of product viscosities and required pumping pressures. One-way pistons similar to piston 60 are available in the industry from sources such as Owens-Illinois, Inc. of Toledo, Ohio.

Formed in the upper portions of container 45 is button guide mounting means 47 which provides for attachment of the volume varying means 70 to container 45. Paticularly, button guide mounting means 47 comprises a substantially cylindrical member in the upper portions of container 45 having a generally ring-like inwardly extending support flange 48 inside its lower edge with a peripheral locking channel 49 formed in the upper surfaces thereof. Button guide mounting means 47 is preferably formed integrally with container 45, but can be a separate element to be attached thereto. Support flange 48 defines an opening 44 through which plunger 10 is to be reciprocated during dispensing operations. Volume varying means 70 includes a push-button actuation means 71 having a button attachment stem 72 designed to interact with plunger attachment means 28 of plunger 10 to integrally attach actuation means 71 to plunger 10. The generally S-shaped button guide 75 mounts within button guide mounting means 47 to support compression spring 73 from below, and includes a ring-like protuberance 76 on its lower surfaces designed to engage with locking channel 49 to lock peripheral flange 32 of diaphragm 35 between button guide 75 and button guide mounting means 47. Compression spring 73 telescopes over plunger attachment means 28, button attachment stem 72, and button guide 75, and acts to maintain upward pressure on actuation means 71 to hold it in a generally retracted position (as shown in FIG. 6).

The interaction of protuberance 76 with locking channel 49 provides a relatively strong mechanical attachment of diaphragm 35 to container 45, thereby establishing a reliable seal between volume varying means 70 and product P contained within container 45. While the means of attaching peripheral flange 32 to container 45 is not critical, it is preferred that a mechanical connection (such as that shown and described with regard to FIGS. 6 and 7) be utilized to prevent degradation or other weakening of diaphragm 35 which might result from alternative forms of attachment such as heat sealing or adhesive connection. By maintaining the integrity of the material of diaphragm 35, the integrity of the seal formed by such diaphragrm is likewise maintained. It is therefore seen that by the unique structure of plunger 10, the manufacturing procedures for the plunger/diaphragm subassembly can be greatly simplified while at the same time diaphragm integrity and the corresponding integrity of the resulting seal formed by such diaphragm can be better insured.

Button guide 75 further serves in conjunction with the inner surfaces of button guide mounting means 47 as a guide for push-button actuation means 71 as it is axially reciprocated during dispensing operations. In particular, the inner cylindrical surfaces of mounting means 47 and the outer surfaces of button guide 75 establish a generally tubular guide channel 77 within which push-button means 71 is supported as it is axially reciprocated. A retaining ring 74 is shown as an example of preferred means for retaining button guide 75 within mounting means 47. Retaining ring 74 might preferably be any thin friction-type ring element, such as thin metal or plastic.

Figure 7:
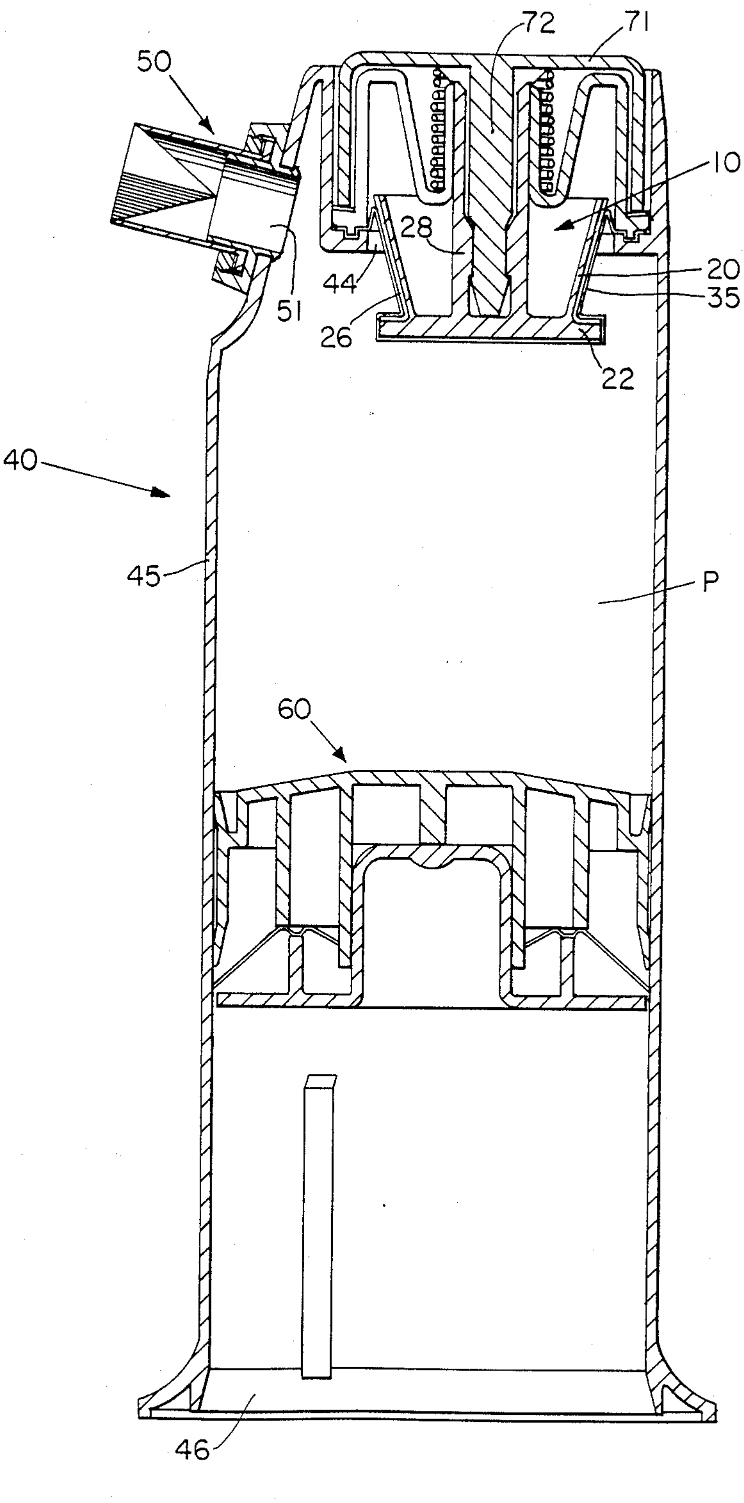
FIG. 7 is a vertical cross-sectional view of the pump dispenser shown in FIG. 6, illustrating the volume varying means in an extended position.

FIG. 7 illustrates the pump dispenser 40 of FIG. 6 following the downward depression of actuation means 71 and the corresponding extension of plunger 10 and diaphragm 35 into the interior of container 45. Extension of plunger 10 into container 45 effectively reduces the volume therewithin, thereby dispensing product through dispensing outlet means 50. A comparison of FIGS. 6 and 7 illustrates how diaphragm 35 literally rolls up and down peripheral skirt 20 between plunger 10 and the inner surfaces of button guide 75 as plunger 10 is reciprocated from its retracted position of FIG. 6 to its extended position in FIG. 7. Diaphragm 35 substantially conforms to the outer surfaces of plunger 10 and, therefore, tends to smoothly roll upon itself as plunger 10 is axially reciprocated between extended and retracted positions. It has been found that although it is not critical that peripheral skirt 20 of plunger 10 be tapered from top to bottom, such taper is preferred to provide additinal space between button guide 75 and the outer surfaces of plunger 10 to permit free and unimpeded rolling of diaphragm 35 therewithin. To permit diaphragm 35 to freely roll upon itself within this space, it is preferred to maintain a minimum of space of at least two and a half times the thickness of diaphragm 35 between the lower surfaces of button guide 75 and the outer surfaces of peripheral skirt 20. Additionally, such taper results in the formation of diaphragm 35 in a generally frusto-conical shape above attachment 22 which tends to roll between retracted and extended positions more smoothly than a generally cylindrical diaphragm whose rolling convolution might have more of a tendency to bind upon itself due to the substantially constant diameter of the diaphragm's shape.

The effective locking action of the diaphragm around the attachment head, as described above, also prevents the formation of multiple convolutions in diaphragm 35 as it rolls upon itself during reciprocation of the plunger, thereby further ensuring smooth rolling action in the pump dispenser. Additionally, such locking action prevents the inversion of diaphragm 35 which can be caused by separation of diaphragm 35 from the distal end 21 of peripheral skirt 20 during the return stroke of plunger 10 following a dispensing operation. In the absence of attachment head 22 and its locking features, separation of diaphragm 35 would allow the formation of an additional convolution in diaphragm 35 adjacent the lower distal end 21 of peripheral skirt 20, which, in turn, might "invert" or roll in a direction opposite to that generally illustrated in FIGS. 6 and 7. Inversion of such additional convolution would interrupt the otherwise smooth rolling action of diaphragm 35 and could lead to unnecessary frictional wear and/or weakening of diaphragm 35 over time. The unique structure of plunger 10 and the attendant locking action of diaphragm 35 thereto obviates such inversion.

It is contemplated that pump dispenser 40 could be partially assembled with its dispensing outlet means 50 and volume varying means 70 assembled onto container 45 prior to bottom filling thereof with product P and placement of follower piston 60 therein below product P. On the other hand, with minor modifications to button guide mounting means 47 and/or volume varying means 71 by one skilled in the art, pump dispenser 40 could be assembled with its dispensing outlet means 50 and follower piston in place prior to top filling of container 45 via opening 44; and, thereafter, assembling volume varying means 70 onto the filled container 45. Likewise the volume varying means 70 and follower piston 60 could first be assembled onto container 45 prior to filling through outlet orifice 51; and, thereafter, attaching dispensing outlet means 50 thereto.

As an example of a pump dispenser made in accordance herewith, a container 45 having an inside diameter of approximately 1.622 inches (approximately 41.2 mm) was chosen; and a plunger 10 was made in accordance herewith having a attachment head 22 with an outside diameter H of approximately 0.826 inches (21 mm), a predetermined outside diameter D of its lower distal end 21 of approximately 0.637 inches (16.2 mm), and an outside diameter d at the upper end of its peripheral skirt 20 of approximately 0.863 inches (approximately 21.9 mm). The wall thickness of peripheral skirt 20 was approximately 0.04 inches (approximately 1.02 mm), and the thickness of attachment head 22 was approximately 0.07 inches (approximately 1.8 mm). The longitudinal height of peripheral skirt 20 (above attachment head 22) was approximately 0.439 inches (approximately 11.2 mm) and the height of plunger attachment means 28 (above attachment head 22) was approximately 0.845 inches (approximately 21.5 mm). Vacumm slots 26 were formed with a width of approximately 0.016 inches (approximately 0.41 mm) and a depth of approximately 0.02 inches (approximately 0.5 mm). The radius r formed at the intersection of peripheral skirt 20 and upper surface or ledge 23 was approximately 0.015 inches (approximately 0.4 mm).

While the thickness T of thermoformable material 30 can vary, as discussed above, it is preferred that such material have a thickness of 0.01 inches (approximately 0.25 mm) or less in a pump dispenser to be utilized for fluent products such as hand cream, toothpaste, and the like. Utilizing such thin material minimizes costs, minimizes frictional resistance within volume varying means 70, and maximizes flexibility of diaphragm 35. While thermoformable material 30 can literally be any material which is thermoformable, it is preferred that such material be a thermoplastic resin or elastomer such as polyethylene, ethylene methyl acrylate (EMA) copolymer, or Hytrel ® (as available from Dupont Company, Polymer Products, Dept., Wilmington, DE). Similarly, while any relatively rigid material can be utilized to form plunger 10, as described above, it is preferred that plunger 10 be formed from plastic materials for economy and ease of manufacture. Additionally, it is preferred that plunger 10 be formed of a material which is substantially incompatible from a heat sealing perspective with the material used to form diaphragm 15. This is important because it is imperative that diaphragm 35 be formed around plunger 10, but not adhered thereto during the thermoforming procedures. Diaphragm 35 must not adhere to peripheral skirt 20 in particular, because such adhesion might impair or prevent the rolling action necessary to maintain the seal around the reciprocating plunger. Compatibility of these materials depends largely on the forming temperatures utilized and the exact thermoforming procedures employed (e.g. cooling procedures can be utilized to prevent adhesion of the plunger and diaphragm). Therefore, materials and/or thermoforming procedures should be chosen to insure that as material 30 is formed around plunger 10, it is not adhered or bounded thereto.

As an example, Hytrel ® thermoplastic elastomer was used as material 30, having a thickness of approximately 0.01 inches (approximately 0.25 mm) and thermoformed over plunger 10 as described above at a temperature of between approximately 165° and 210° C. Thereafter, this plunger/diaphragm subassembly was incorporated into a pump dispenser as shown in FIGS. 6 and 7 having a plunger opening 44 with an inside diameter of approximately 0.905 inches (approximately 23 mm). As shown in FIGS. 6 and 7, the inside diameter of plunger cylinder opening 44 is preferably substantially identical to the inside diameter of button guide 75. The other dimensions of the pump dispenser of this example will not be recited specifically, as they are not critical to understanding the subject invention. Such dimensions can be varied as desired; however, should be substantially proportional to given the dimensions of the elements above and as illustrated in FIGS. 6 and 7.

The effective width of ledge 23 in the above example was approximately 0.095 inches (approximately 2.4 mm) and functioned well to attach the flexible diaphragm to the plunger, and thereby facilitated the rolling action of such diaphragm in use. The exact dimensions of such ledge can be varied according to the specific dimensions of plunger 10 and in accordance with the thickness and overall stiffness characteristics of material 30 to be formed thereon. For example, it is contemplated that a smaller effective peripheral ledge 23 might be required to effectively lock on a diaphragm 35 made from slightly thicker or slightly more rigid material. The minimum width of ledge 23 is that which is required to effectively lock a diaphragm 35 onto a plunger 10 under the operation and pressure requirements of a particular dispenser 40. On the other hand, the maximum width of ledge 23 can be determined by minimal experimentation for a particular plunger and particular material) 30, as ledges which are too wide tend to cause stress cracks and fractures in the resulting diaphragms 35. Such cracks and fractures are undesirable as they compromise the integrity of diaphragm 35 and the seal created thereby.

Plungers and diaphragms made in accordance with the subject invention have been found to operate with less friction within the piston or plunger opening 44 than generally encountered with conventional piston/-piston cylinder sealing arrangements, thereby providing dispensing of contained product with less back pressure or force required to initiate dispensing. Additionally, the plunger/diaphragm subassemblies are much easier to manufacture and handle during the assembly procedures, as discussed above. Individual flexible diaphragms need not be handled after forming procedures, as the subject diaphragms are already attached as a subassembly to a plunger. Therefore, the plunger acts as a custom mold for its own diaphragm member, and the completed subassembly can be easily handled by high speed equipment. The flexible seal created by diaphragm 35 allows a greater amount of manufacturing tolerance, thereby reducing manufacturing cost and wated product, and the seal created wihin such pump dispenser is of relatively higher quality due to the manner in whcih diaphragm 35 is attached to plunger 10.

Having shown and described the preferred embodiment of the present invention, further adaptions of the pump dispenser can be accomplished by appropriate modifications to the structures thereof by one of ordinary skill in the art without departing from the scope of the present invention. For example, material 30 described herein could be a coextruded and/or laminated structure combining several materials to improve particular characterists of a diaphragm 35 such as compatibility with contained product, heat sealing qualities, strength and resiliency, and the like. Accordingly, the scope of the present invention should be considered in terms of the following claims and is understood not to be limited to the details of structure and operation shown and described in the specification and drawings.

What is claimed is:

1. A pump dispenser for fluent products including a container for housing said product, dispensing outlet means on said container, a follower piston closing the lower end of said container below said product, and means for varying the volume within such dispenser, said volume varying means comprising:

(a) a plunger adapted to be reciprocated within said dispenser to alternately decrease the volume therewithin and, following such decrease, return to its original position thereby increasing the volume within said dispenser, said plunger further comprising a peripheral skirt having predetermined lateral dimensions at its lower distal end, and an enlarged attachment head on said lower distal end, said enlarged head having predetermined outer lateral dimensions which are larger than the diameter of the distal end of said peripheral skirt thereby effectively forming a reentrant portion on said plunger above said enlarged head, said reentrant portion including an inwardly extending ledge surface; and (b) a flexible thin-walled diaphragm adapted to isolate and seal said volume reducing means from said fluent product, said diaphragm being connected about its outer periphery to said dispenser, and having a central portion substantially conforming to said attachment head and reentrant portion of said plunger thereby interacting with said inwardly extending ledge surface to effectively mechanically lock said diaphragm to said plunger and attachment head, said diaphragm being adapted to provide a substantially frictionless seal between said reciprocable plunger and said fluent product.

2. The pump dispenser of claim 1, wherein said peripheral skirt of said plunger is slightly tapered from top to bottom such that its outer lateral dimensions are larger at the top than the predetermined outer lateral dimensions of its lower distal end.

3. The pump dispenser of claim 2, wherein said plunger and its enlarged attachment head are substantially round in cross-section such that said enlarged head is substantially disk-like in conformation, and wherein said diaphragm is adapted to provide a rolling-type, substantially frictionless seal between said reciprocable plunger and said fluent product, and wherein said effective locking of said diaphragm to said plunger and disk-like attachment head facilitates smooth rolling of said diaphragm as said plunger is reciprocated during dispensing operations by preventing the formation of multiple convolutions in said diaphragm and inversion of such convolutions.

4. The pump dispenser of claims 1 or 3, wherein said thin-walled diaphragm is made of thermoformable material.

5. The pump dispenser of claim 4, wherein said plunger includes means formed therein to provide fluid communication of said plunger with a source of vacuum during diaphragm thermoforming procedures, such that said means allows said vacuum source to draw the thermoformable material snugly around said attachment head and against the inwardly extending ledge surface thereof and the lower distal end of said peripheral skirt of said plunger, thereby forming said diaphragm around the plunger and effectively locking the diaphragm thereto.

6. The pump dispenser of claim 5, wherein said means on said plunger to provide fluid communication with a source of vacuum comprises one or more longitudinal slots formed axially along the outer surface of said peripheral skirt and continuing across the upper face of said enlarged attachment head.

7. The pump dispenser of claim 6, wherein said plunger is formed as a unitary structure.

8. The pump dispenser claim 6, wherein the enlarged attachment head of said plunger is formed separately from said peripheral skirt, such separate pieces being connected together to form said plunger.

9. A pump dispenser for fluent products including a container for housing said product, dispensing outlet means on said container, a follower piston closing the lower end of said container below said product, and means for varying the volume within such dispenser, said volume varying means comprising:

(a) a plunger adapted to be reciprocated within said dispenser to alternately decrease the volume therewithin and, following such decrease, return to its original position thereby increasing the volume within said dispenser, said plunger further comprising a peripheral skirt which is slightly tapered from its upper end to its lower distal end, and a disk-like attachment head on said lower distal end, said disk-like head having a predetermined diameter which is larger than the diameter of the lower distal end of said peripheral skirt thereby effectively forming a reentrant portion on said plunger above said disk-like head, said reentrant portion including an inwardly extending ledge surface; and (b) a flexible thin-walled diaphragm adapted to isolate and seal said volume reducing means from said fluent product, said diaphragm being connected about its outer periphery to said dispensing container, and having a central portion substantially conforming to said disk-like attachment head and said reentrant portion of said plunger thereby interacting with said inwardly extending ledge surface to effectively mechanically lock said diaphragm to said plunger and disk-like head, said diaphragm being adapted to provide a rolling-type substantially frictionless seal between said reciprocable plunger and said fluent product, wherein said effective locking of the diaphragm to said plunger and disk-like head facilitates smooth rolling of said diaphragm as the plunger is reciprocated during dispensing operations by preventing the formation of multiple convolutions and inversion of such convolutions in said diaphragm.

10. The pump dispenser of claim 9, wherein said thin-walled diaphragm is made of thermoformable material.

11. The pump dispenser of claim 10, wherein said plunger includes means formed therein to provide fluid communication of said plunger with a source of vacuum during diaphragm thermoforming procedures, such that said means allows said vacuum source to draw the thermoformable material snugly around said disk-like head and against said inwardly extending ledge surface thereof and the lower distal end of the peripheral skirt of said plunger, thereby forming said diaphragm around said plunger and effectively locking the diaphragm thereto.

12. The pump dispenser of claim 11, wherein said means on the plunger to provide fluid communication with a source of vacuum comprises one or more longitudinal slots formed axially along the outer surface of said peripheral skirt and continuing across the upper face of said disk-like head.

13. The pump dispenser of claim 12, wherein said plunger is formed as a unitary structure.

14. The pump dispenser of claim 12, wherein said disk-like head of said plunger is formed separately from said peripheral skirt, such separate pieces being connected together to form said plunger.

15. The pump dispenser of claim 13 or 14, wherein said thermoformable material comprises a thermoplastic resin.

16. The pump dispenser of claim 15, wherein said thermoplastic resin has a substantially uniform thickness of approximately 0.25 mm or less.

17. A method of manufacturing a volume varying means subassembly for use in a pump dispenser for fluent products having a container for housing said product, dispensing outlet means on said container, a follower piston effectively closing the lower end of said container and supporting said product thereabove, and means to vary the volume within said dispenser, said method comprising the following steps:

(a) forming a plunger member adapted to be reciprocated within said dispenser to alternately decrease the volume therewithin and, following such decrease, return to its original position thereby increasing the volume within said dispenser, said plunger further comprising a peripheral skirt having predetermined outer lateral dimensions at its lower distal end, and an enlarged attachment head on said lower distal end, said attachment head having predetermined outer lateral dimensions which are larger than said lateral dimensions of the distal end of said peripheral skirt, thereby effectively forming a reentrant portion on said plunger above said attachment head, said reentrant portion including an inwardly extending ledge surface;

(b) locating a sheet of flexible thermoformable material adjacent the lower surface of said attachment head of said plunger;

(c) heating said thermoformable material to a temperature sufficient to permit thermoforming thereof;

(d) thermoforming said thermoformable material around the outer surfaces of said attachment head and the reentrant portion of said plunger, thereby conforming portions of said thermoformable material to said reentrant portion and its inwardly extending ledge surface and effectively mechanically locking said material to the outer lower edges of said plunger and its attachment head; and (e) cutting said thermoformed material as desired at a predetermined radial distance about the periphery of the plunger to provide a flexible diaphragm connected to said plunger as described.

18. The method of claim 17, wherein said step of thermoforming said thermoformable material around said attachment head is accomplished by subjecting the thermoformed material to a vacuum which draws said thermoformable material over said attachment head and snugly against said inwardly extending ledge surface and the peripherial skirt of said plunger.

19. The method of claim 18, wherein said thermoformable material comprises a thermoplastic resin.

* * * * *